(12) United States Patent
Choe

(10) Patent No.: US 10,956,655 B2
(45) Date of Patent: Mar. 23, 2021

(54) AUTOMATED PRODUCTION OF DATA-DRIVEN REPORTS WITH DESCRIPTIVE AND RICH TEXT AND GRAPHICAL CONTENTS

(71) Applicant: PredictX Limited, London (GB)

(72) Inventor: Keesup Choe, London (GB)

(73) Assignee: PREDICTX LIMITED, London (GB)

( * ) Notice: Subject to any disclaimer, the term of this patent is extended or adjusted under 35 U.S.C. 154(b) by 0 days.

(21) Appl. No.: 16/421,465

(22) Filed: May 23, 2019

(65) Prior Publication Data

US 2020/0073917 A1  Mar. 5, 2020

Related U.S. Application Data

(63) Continuation of application No. PCT/US2019/033864, filed on May 23, 2019.

(60) Provisional application No. 62/676,277, filed on May 24, 2018, provisional application No. 62/675,711, filed on May 23, 2018.

(51) Int. Cl.
| | |
|---|---|
| *G06F 40/106* | (2020.01) |
| *G06Q 10/10* | (2012.01) |
| *G06T 11/20* | (2006.01) |
| *G06T 11/60* | (2006.01) |
| *G06F 40/186* | (2020.01) |
| *G06F 40/56* | (2020.01) |
| *G06N 20/00* | (2019.01) |

(52) U.S. Cl.
CPC .......... *G06F 40/106* (2020.01); *G06F 40/186* (2020.01); *G06F 40/56* (2020.01); *G06Q 10/10* (2013.01); *G06T 11/20* (2013.01); *G06T 11/60* (2013.01); *G06N 20/00* (2019.01)

(58) Field of Classification Search
CPC ...... G06F 40/106; G06F 40/186; G06F 40/56; G06Q 10/10
See application file for complete search history.

(56) References Cited

U.S. PATENT DOCUMENTS

| | | | |
|---|---|---|---|
| 2006/0064631 A1* | 3/2006 | Parker | G06F 40/58 715/255 |
| 2011/0161925 A1* | 6/2011 | Wang | G06Q 10/10 717/109 |
| 2015/0067520 A1* | 3/2015 | Kovacs | G06Q 10/10 715/733 |
| 2015/0309990 A1* | 10/2015 | Allen | G06F 16/245 704/9 |

\* cited by examiner

*Primary Examiner* — Asher D Kells

(74) *Attorney, Agent, or Firm* — Loeb & Loeb LLP

(57) ABSTRACT

Embodiments of the invention automate some of the human report generation process with the application of new AI and machine learning technologies plus the automatic generation of cutting-edge infographics, that is also not aesthetically pleasing but also engage the report reading audience. Aspects of the invention employ specific implementations of natural language generation and the recognition of elements of infographics that complimentary to the natural language generation.

18 Claims, 20 Drawing Sheets

01 | Preface
Overview of your data sources

02 | Travel Summary - Global
Your overall travel summary and top destinations 03 | Category Breakdown - Global
Your breakdown of spend by Travel Category 04 | Air Summary - Global
Air Category insights 05 | Hotel Summary - Global
Hotel Category insights 06 | Trip Reasons - Global
Reasons for travel explained 07 | Expense Summary - Global
Expense spend trends and averages 08 | Savings Opportunities - Global
Opportunities for travel programme savings 09 | Travel Spend Appendix - Global
All of the detail behind the summary

FIG. 6

Your Travel Summary all in one place

This report is for Global for the period Jan - Mar 2018 YTD. The report uses USD as the reporting currency. Sources included in this reporting are as follows:

Travel Spend

BCD: Vietnam, Colombia, Costa Rica, United Arab Emirates, Czech Republic, Brazil, Austria, South Africa, Australia, Mexico, Belgium, Cabo Verde, United States of America, Spain, Saudi Arabia, Taiwan, Italy, Chile, South Korea, Venezuela, Romania, Qatar, Peru, Switzerland, Germany, Argentina, India, Cote d'Ivoire, Canada, Singapore, Ecuador, Thailand, Uruguay
HRG: United Kingdom, Switzerland, Iran, Greece, Philippines, Costa Rica, Panama, Lebanon, Cameroon, Laos, Romania, Finland, Italy, Australia, Egypt, Germany, France, Poland, Hungary, Slovakia, Kuwait, Ireland, United Arab Emirates, Czech Republic
CWT: Denmark, Japan, Egypt, Netherlands, Hungary, China, Portugal Travel spend data is for travel booked during the current period - meaning the air ticket is issued during this current period, but actual flight could take place later.

Expense Spend

Concur: Canada, Australia, United States, China, Mexico, France, Brazil, Korea, Republic Of, Malaysia, Taiwan, Colombia, Philippines, Bulgaria, Singapore, India, Belgium, Argentina, New Zealand, Thailand, Viet Nam, Myanmar, Indonesia, Costa Rica, Bangladesh, Hungary, Latvia, Switzerland, Romania, Venezuela, Uruguay, Peru, Netherlands, Ecuador, Chile, Sri Lanka, Lithuania, Bolivia, Slovenia Expense spend data is travel data - meaning expenses accrued in this current period.

Category Breakdown - Global
Jan - Mar 2018 YTD

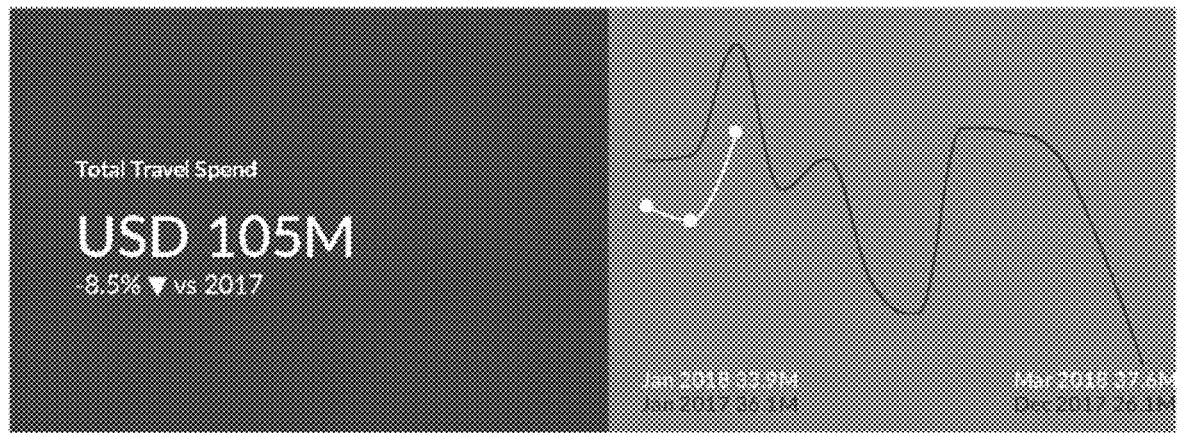

Total Travel Spend

USD 105M

8.5% ▼ vs 2017

Travel Spend by Category

Below is your Total Travel Spend broken down by travel category for Air, Hotel, Car and Rail. The analysis below provides insight into year on year travel patterns and increases or decreases in spend volume per category provides insight into the distribution of spend amongst the travel mix.

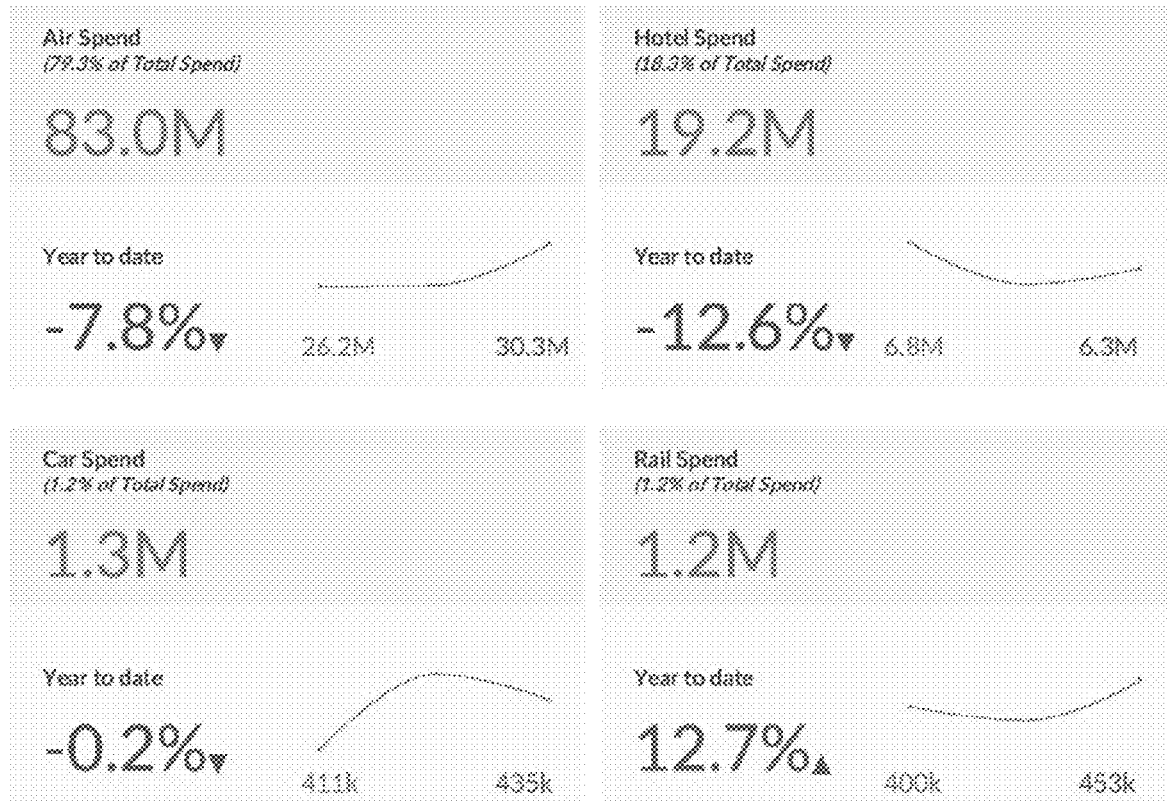

Hotel Summary - Global
Jan - Mar 2018 YTD
FIG. 11
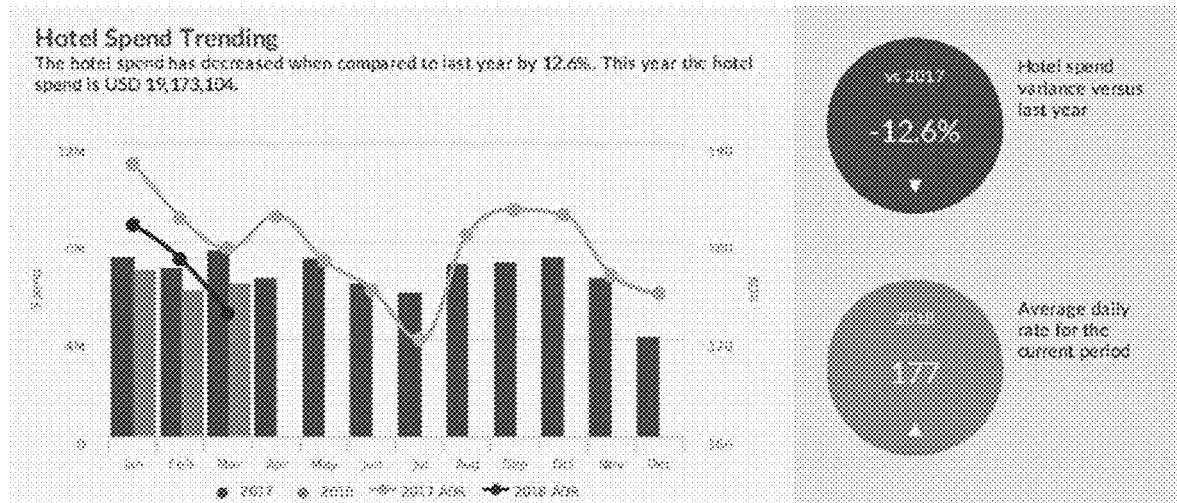
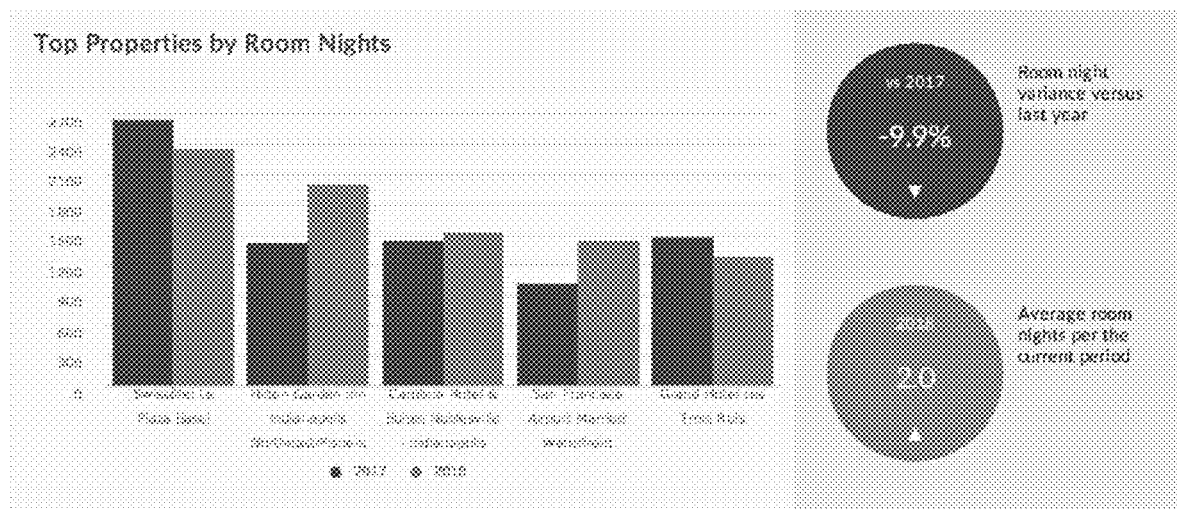
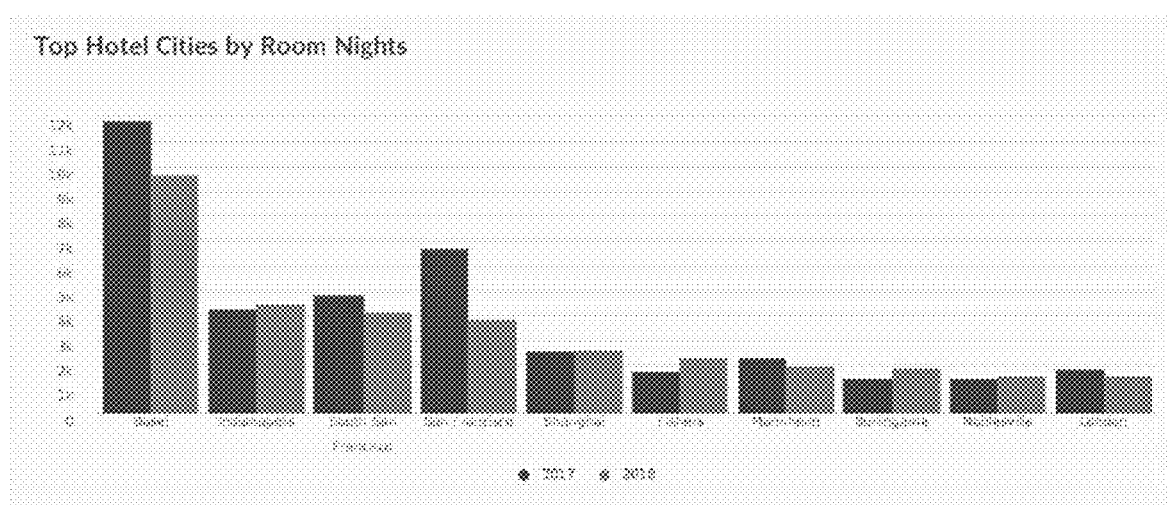

Trip Reasons - Global
Jan - Mar 2018 YTD

FIG. 12

Internal Trips

Internal trips represent travel that is carried out on behalf of internal requirements of the business. This can include attendance at internal meetings, site visits or employee training.

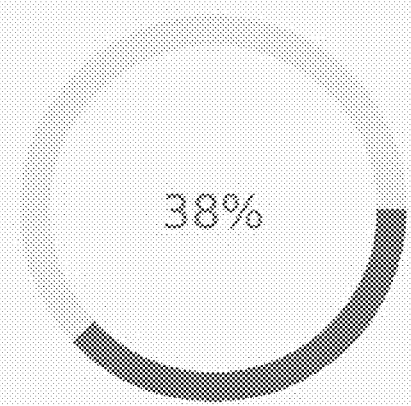

38%

| | |
|---|---|
| Year to Date | Year to Date |
| 41.1M | -14.2% ▼ |
| 14.1M | 14.2M |

| | |
|---|---|
| Internal Global Meetings | 40.4M |
| Relocation / Home Leave | 652.8k |
| Project | 1.5k |

External Trips

External trips represent travel that is carried out on behalf of external requirements to the business. This could be attendance of trade conferences, client meetings or sales meetings.

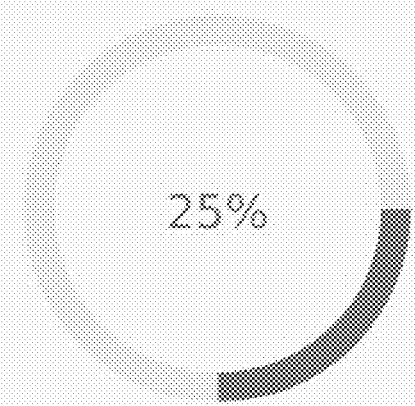

25%

| | |
|---|---|
| Year to Date | Year to Date |
| 16.0M | -6.0% ▼ |
| 4.8M | 5.7M |

| | |
|---|---|
| External Client Meeting | 16.0M |
| Trade Show / Conf. | 13.4k |
| Customer Facing | 2.3k |

Trip Spend with No Trip Reason Coding: 25.8M | 36.5%

Savings Opportunities - Global
Jan - Mar 2018 YTD

FIG. 14

Your Savings Opportunities
These are your savings opportunities for Global. The information below will give you insight into the areas of your travel programme where you have lost opportunities and where savings have been realised through compliance to policy. Each category focuses on specific policy types and travel categories where savings can be realised. There is also reference to realising these savings opportunities through certain routes or city information.

Low Fare Savings Opportunities

Advanced Booking Savings Opportunities

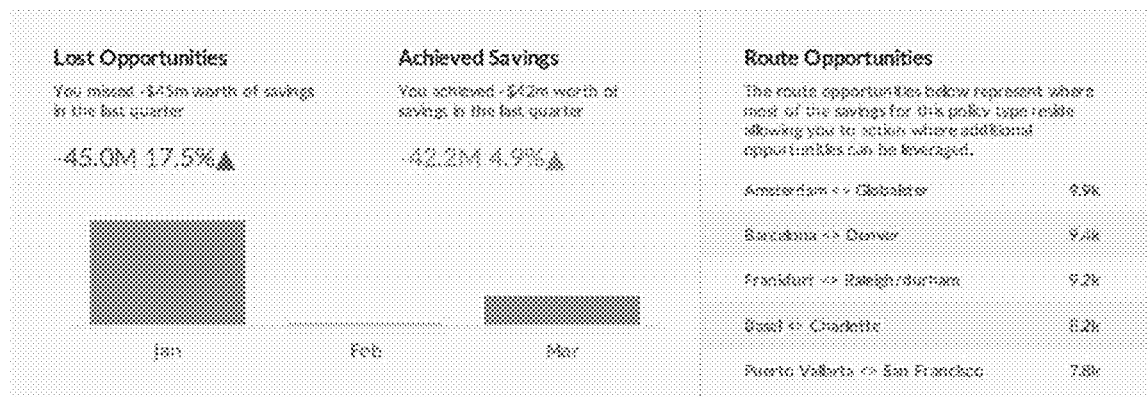

Preferred Hotel Savings Opportunities

FIG. 15

Air Metrics

Air metrics reported below are based on travel agency sources only. Spend amounts are reported in report currency (USD).

| KPI | 2018 | 2017 | Variance(%) |
|---|---|---|---|
| Spend | 83.0M | 90.0M | -7.8 |
| - IntCont | 53.3M | 58.2M | -8.3 |
| - Regional | 9.4M | 9.4M | -0.0 |
| - Domestic | 20.2M | 22.4M | -9.7 |
| Tickets | 93.4k | 93.7k | -0.3 |
| ATP | 888 | 960 | -7.5 |
| Cost per mile | 0.35 | 0.36 | -2.8 |
| Avg. Days in Advance | 22 | 24 | -8.3 |
| Mileage | 234M | 247M | -5.3 |
| $CO_2$ (/kg) | 102M | 110M | -6.7 |
| Online Bkings (%) | 56 | 53 | 5.7 |

O&D Metrics

Values below represent the average ticket price (ATP) issued per bi-directional city pair. ATP amounts are reported in report currency (USD).

| KPI | 2018 | 2017 | Variance(%) |
|---|---|---|---|
| BSL <> SFO | 4.4k | 4.2k | 5.2 |
| SFO <> ZRH | 6.0k | 5.8k | 3.3 |
| LHR <> SFO | 4.7k | 5.2k | -8.4 |
| FRA <> IND | 4.7k | 4.5k | 4.9 |
| SFO <> ZRH | 5.4k | 5.3k | 2.7 |
| MUC <> SFO | 5.6k | 5.9k | -4.3 |
| FRA <> SFO | 6.2k | 6.0k | 4.0 |
| IND <> ZRH | 4.6k | 5.2k | -10.8 |
| SIN <> ZRH | 4.6k | 4.3k | 7.6 |
| EWR <> SFO | 880 | 941 | -6.5 |

Hotel Metrics

Hotel metrics reported below are based on travel agency sources only. Spend amounts are reported in report currency (USD).

| KPI | 2018 | 2017 | Variance(%) |
|---|---|---|---|
| Spend | 19.2M | 21.9M | -12.6 |
| Bookings | 51.7k | 54.3k | -4.6 |
| Room Nights | 108k | 120k | -9.9 |
| Pref. Hotel (%) | 50 | 54 | -7.4 |
| ADR | 177 | 183 | -3.1 |

Hotel City Metrics

Hotel city metrics reported below are based on travel agency sources only. Values below represent the average daily rate (ADR) per city. ADR amounts are reported in report currency (USD).

| KPI | 2018 | 2017 | Variance(%) |
|---|---|---|---|
| Basel | 240 | 239 | 0.2 |
| San Francisco | 310 | 328 | -5.4 |
| South San Francisco | 204 | 221 | -7.8 |
| Indianapolis | 123 | 121 | 1.8 |
| Burlingame | 257 | 276 | -6.7 |
| London | 299 | 286 | 4.8 |
| New York | 288 | 307 | -6.2 |
| Shanghai | 146 | 145 | 0.6 |
| Mannheim | 179 | 145 | 23.7 |
| Chicago | 252 | 253 | -0.4 |

Car Metrics

Car metrics reported below are based on travel agency sources only. Spend amounts are reported in report currency (USD).

| KPI | 2018 | 2017 | Variance(%) |
|---|---|---|---|
| Spend | 1.3M | 1.3M | -0.2 |
| Bookings | 11.9k | 11.3k | 4.8 |
| Rental Days | 37.9k | 37.3k | 1.7 |
| ADR | 34 | 35 | -2.2 |

Savings Opportunities

The savings opportunities presented below relate to Air agency data only where the lowest fare has not been taken. Savings are reported in report currency (USD).

| KPI | 2018 | 2017 | Variance(%) |
|---|---|---|---|
| Lowest Fare Booked – Full Savings Achieved | 1.9M | 2.3M | -16.4 |
| Unknown | 621k | 909k | -31.7 |
| Declined due to Time Preference | 1.7M | 1.7M | 0.6 |
| Declined due to Carrier | 931k | 931k | 0.0 |

| | | | |
|---|---|---|---|
| Exchange Ticket | 22.1k | 2.1k | - |
| Declined due to Connection | 830k | 902k | -8.0 |
| Total | 6.0M | 6.7M | -10.1 |

Your Travel Summary

Compared to the previous month, the number of trips has remained the same; however, compared to last year, it has decreased by 3%.

AUTOMATED PRODUCTION OF DATA-DRIVEN REPORTS WITH DESCRIPTIVE AND RICH TEXT AND GRAPHICAL CONTENTS

CROSS REFERENCE TO RELATED APPLICATION

This is a nonprovisional patent application of U.S. provisional application Ser. No. 62/675,711, filed on May 23, 2018 and U.S. provisional application Ser. No. 62/676,277, filed on May 24, 2018, whose disclosures are incorporated by reference in their entirety herein. This application also claims priority to PCT international application serial number PCT/US19/33864, filed on May 23, 2019, whose disclosure is incorporated by reference in its entirety herein.

BACKGROUND

Businesses communicate data-centric information mainly by generating reports from a few standard tools such as Excel. Increasingly, Business Intelligence ("BI") tools like Tableau and Qlik are also used to display charts and graphs. These tools were designed to facilitate work by analysts who are using advanced functions to transform the data to gain understanding. Analysts need the most functional tool for this purpose. Yet the vast majority of the people receiving these reports are not analysts. They are executives, stakeholders whose interest is merely to be informed and perhaps take a business decision based on the data within the reports. This creates a conflict between the needs of the analyst and the needs of the stakeholders.

How do you engage with these stakeholders? How do you influence behavior throughout the business when many report recipients never open the document, and of those that do, even fewer take the time to read and analyze the information contained in them.

Business Intelligence has largely failed as a business activity designed to deliver actionable insight to executives because it left a yawning chasm between the delivery of information and the development of insights from that information. This was largely due to the inability to develop a narrative that was relevant to most report recipients. It is these narratives that are vital to the effective transmission of knowledge from one individual to another. This is hardwired into human societal evolution; before the advent of written communication, human beings transmitted knowledge using narratives. Customary laws, religious texts and conventional wisdom were all transmitted through the medium of storytelling, making it the oldest human art. Human beings understand through narrative.

The only way business users generated content-rich, stakeholder-friendly reports was by manually creating the report in PowerPoint or Word. The analysts copy and paste charts and graphs from excel or other tool into Word, then write a narrative of what the chart is conveying. The narrative is the key to transforming static charts and graphs into a more understandable and meaningful report.

Of course, the exercise of creating this report is manual, and extremely time consuming. Also, the types of charts that these report writers may generate at extremely basic, such as those that may be generated in Excel or PowerPoint. Beautifully designed infographics is out of the expertise and know-how of most business users.

Manual work is inherently not scalable and costly. In addition, similar to other knowledge work performed manually, the knowledge of manually generating reports is difficult to retain as a corporate asset with staff turnover.

SUMMARY

Embodiments of the invention attempt to bridge this gap and build the technology necessary to engage with the stakeholders. Aspects of the invention aim to combine the still-developing technologies of natural language generation, machine learning, and intuitive and dynamic infographics to automatically analyze and construct narrative around the data that is being presented, packaging them together in a mobile-capable report that enables that communicates via both visuals and narrative to stakeholders—like telling a story.

In another aspect, embodiments of the invention automate some of the human report generation process with the application of new AI and machine learning technologies plus the automatic generation of cutting-edge infographics, that is also not aesthetically pleasing but also engage the report reading audience. The breakthrough is only possible now due to the significant innovation in the application of AI technologies, especially Natural Language Generation and the recognition of elements of infographics that complimentary to the natural language generation.

Aspects of the invention remedy the challenges faced: the lack of automation is obvious when trying to generate a set of reports for a subset of the organization, such as for business units. Even if the layout remains the same, an annotated report for each business unit requires an analyst to generate the charts and graphics for each business unit, examine this result to highlight the salient aspects, and then to write textual content for each business unit. For a large corporation with dozens or hundreds of business units, this endeavor is a time and resource intensive process.

In addition, embodiments of the invention recognize that the analysts manually creating these annotated reports will not be of the same level of proficiency in their ability to design, layout, and create an engaging, effective report as professional designers. Aspects of the invention are designed from ground up by professional graphic designers who have created the templates that generate graphically attractive reports each and every time.

Moreover, embodiments of the invention are designed and built to combine modern visualization normally found on infographics with narrative insights usually created manually within an intuitive and engaging report format and build the technology necessary to engage with the Stakeholders. Features of the invention attempt to combine the still-developing technologies of natural language generation, machine learning, and intuitive and dynamic infographics to automatically analyze and construct narrative around the data that is being presented, packaging them together in a mobile-capable report that enables that communicates via both visuals and narrative to stakeholders.

BRIEF DESCRIPTION OF THE DRAWINGS

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

FIGS. 5-17 are sample report pages according to one embodiment of the invention.

FIG. 19 is an illustration of a generated text according to one embodiment of the invention.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Given the attention span and the need to recognize and identify actionable items, an effective approach to deliver the information is to generate a report that tells a story. Of course, one of the biggest challenges is the generation of a storytelling report on its own, as you need to guide the reader providing him with useful information that has to be retrieved from a, possibly huge, amount of data. This involves not just the presentation of the information but also the organization of the information. Also, composition of the information showed needs to follow a story guide, starting stories from coarse-grained insights and going into deep insights through fine-grained information.

Other main challenge is how to create sentences with proper meaning without sounding like a robot. Embodiments of the invention describe some of the relevant aspects of this challenge:

It is a complex area without almost any commercial implementation. The complexity of generating natural language comes, inherently, from the complexity of the languages themselves. We may find that different languages as English and German have their own particularities despite both come from the same root language. And if we want to make implementations on other different languages it could be even more complex by introducing Spanish that has different kind of grammar, or totally different like Chinese or Arabic.

Figure 1:
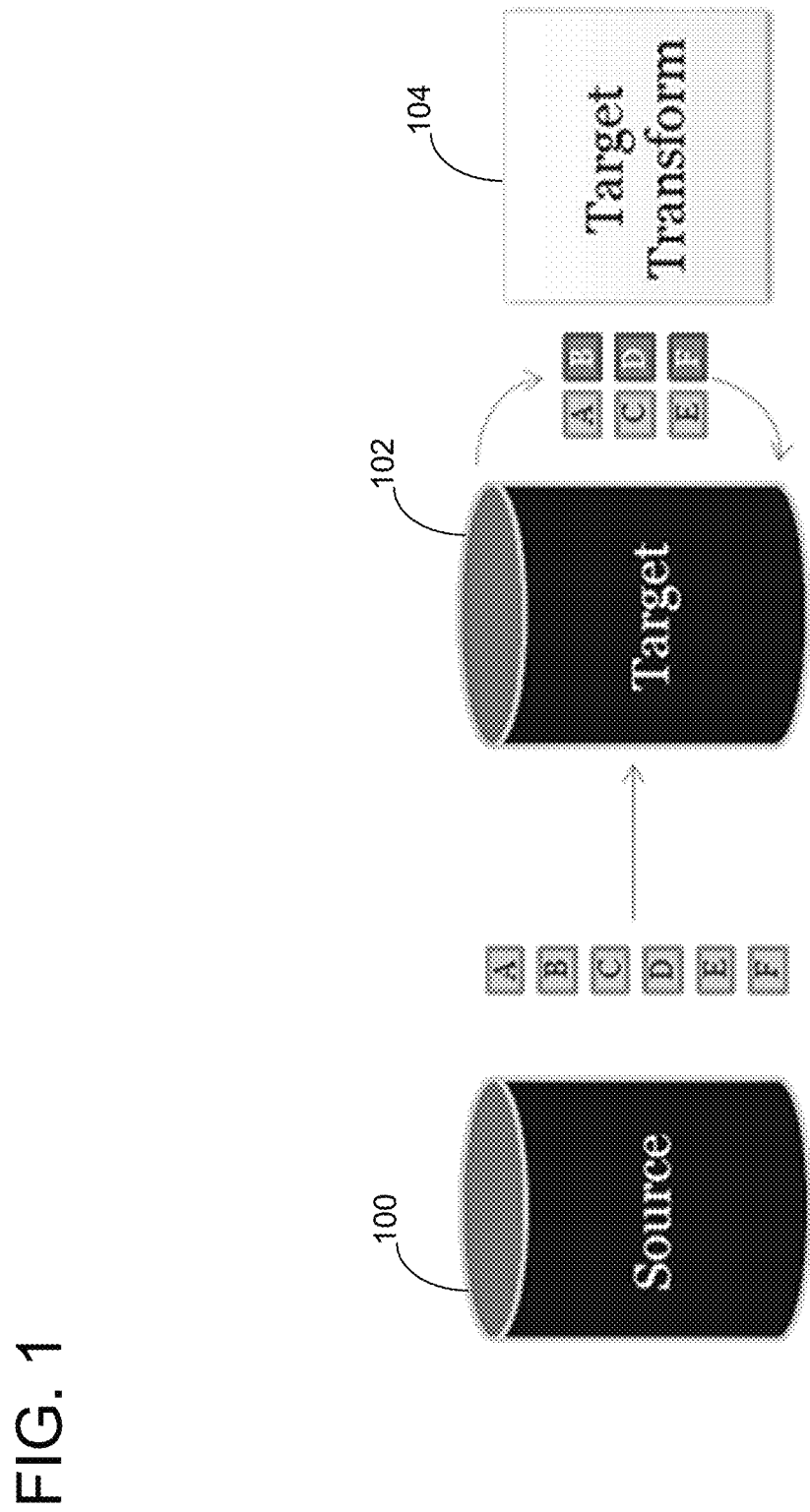
FIG. 1 is a diagram of a general illustration of aspects of the invention.

There is a lack of resources for most languages. Referring to FIG. 1, a source 100 in English as English is predominant as there are more researchers involved on it from UK and the USA, and those scientists are pioneering on its research and further use. Fortunately, it seems to be growing very quickly in the past recent years, thanks to the interest of different industries which start to understanding possible uses in product development.

In one example, testing of a system that generates text based on new context is difficult. Software testing may be based on comparing a known output versus new output and confirming that unwanted differences do not exist. But language may have many variances and options. Aspects of the invention may partially reduce the variance and seek for robustness and then being able to detect errors by reproducing them on a controlled testing environment.

Another challenge that aspects of the invention overcome is the, potential, huge amount of data that the system needs to transform, such as 104 in FIG. 1, through different steps until obtaining data ready to use.

Generation of Charts:

This wasn't a problem per se but embodiments of the invention needed to be able to use many different chart formats so that the resulting reports could incorporate the best charts and visualization techniques available at the time and tailored to the audiences of the report.

One embodiment may store images with a determined size, and it was going to evolve into a scalability problem if one may wish to generate different sizes or qualities for different kind of displays. So, at the end, one embodiment applies a standard format (SVG) with the possibility of generation on demand instead of persisted.

Also it is difficult to provide quality assurance of the report generated, as it requires to test something that has never been created before and, therefore, it doesn't have anything to check against.

Moreover, aspects of the invention include the automation of insight extraction through the generation of configuration files for each use case or client. This configuration allows for the extraction of desired metrics and Key Performance indicators (KPIs) across the execution of multiple steps. This may allow the administrator to configure each report to cascade from high-level to detailed information in a natural manner.

The natural language technology emphasizes the inflection of English words, from a grammar check point of view, the technology also may incorporate more subtle use of language to incorporate cultural inflections and differences. In one embodiment, aspects of the invention may look up relevant industry use dictionaries to use terms that are more relevant.

It is complex to manage with lack of resources focused on Natural Language Generation. Aspects of the invention start on English due to the fact that more resources exist in this language that proved useful for our purposes. More recently, in another embodiment, aspects of the invention have managed to get a Spanish version running on latest releases. In both cases, English and Spanish, aspects of the invention customize the lexicon to provide a closer language to our customer's domain instead of generic language. Of course, by no means embodiments of the invention are limited to these two languages.

Deep Learning algorithms are used to improve aspects such as sentence and grammar correction and resolve the problem that static testing does not work when the text being generated is dynamic.

Regarding the amount of data, aspects of the invention have been able to parallelize the work and, if needed in the future, apply horizontal elasticity.

Finally, another important bit is to ensure Quality Assurance on charts generation and the actual creation of the report. Aspects of the invention evolve from an image generator to an SVG generator. In one embodiment, this may enable skipping the generation of images in different sizes and formats to adapt to any kind of devices and displays. Aspects of the invention move into the generation of a generic report in HTML that could be easily tested and later transformed into PDF, see also FIGS. 5 through 17.

Once the raw data from the customer is received, an administrator user with some knowledge of the data domain, configures the system to evolve from this raw data to the main KPIs which will be showed into the storytelling report. This involves different sub-steps commonly used into ELT systems such as, for example, data cleaning, data integration, data transformation, and reduction by aggregation, all when required. In one embodiment, aspects of the invention generate or store a common model for each vertical business, so once an administrator user configure all these first sub-steps to populate the common model, the system may reuse the data as it knows how is distributed the data into the common model.

ELT Process

Once the data is populated into the common model, aspects of the invention may provide the configuration for the storytelling report generation. This configuration may include a base template with the customer brand information (e.g. a template with brand logos and images adapted to the customer brand) and a structure that defines all visualization items that will be added to the report (e.g. a JSON file that defines the structure of the report that will be generated with information about where a text generated or an image generated are required).

Figure 2:
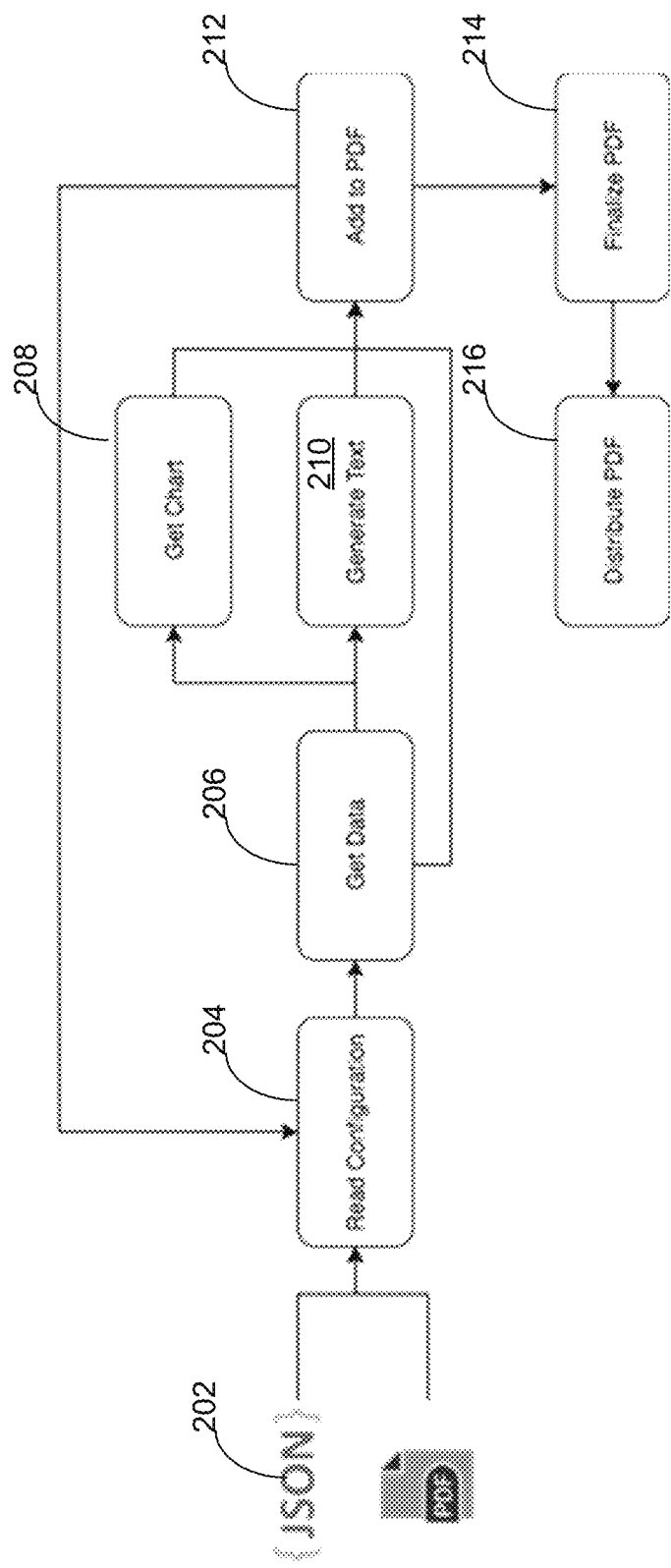
FIG. 2 is a diagram illustrating JSON configuration and HTML or PDF template according to one embodiment of the invention.

For example, FIG. 2, as a flow diagram illustrating at least the following different steps. In one embodiment, at 204, configurations may be read to identify the parameters. For example, after the configuration files may identify a base template with the customer brand information (e.g. a template with brand logos and images adapted to the customer brand) and a structure that defines all visualization items that will be added to the report. In one example, FIGS. 5 to 17 illustrate a sample of such desirable output, as such, the configuration files may include a cover page with title and desirable scope of the report, as illustrated in FIG. 5. In one embodiment, the configuration may include a background image or graphics for the report. In FIG. 6, a table of contents or summary of sections may be provided. In one aspects, the configuration files may include specific layout preferences, such as color, font type faces, etc., for the texts.

In another embodiment, the configuration file may include a summary or an executive summary page, such as shown in FIG. 7. Next, the configuration file may further include a graphical representation along with texts in a further detailed summary page in FIG. 8. In one aspect, the graphical representation may be presented as a function of the contents. For example, as the contents are related to travel, maps may be used. Depending on the area of the travel, instead of the map of the different continents, states or cities may be shown. As such, as a function of the contents to be displayed, the graphical representation may present graphical elements at a different scale, such as cities to states, or states to countries.

In another embodiment, as a function of the configuration files, the configuration files may specify the number of detail pages for the output. For example, FIGS. 9-16, aspects of the invention may provide one page for each detailed information. For example, the report show in FIGS. 5-17 are related to travel spending. As such, summary of travel expenses (FIG. 9), air travel expenses (FIG. 10), hotel expenses (FIG. 11), reasons of travel (FIG. 12), and expenses summary (FIG. 13) may be displayed. It is to be understood the level of details may depend on the type of data source and information provided.

FIG. 14 may present savings opportunities for the travel as illustrated in the previous figures. In one aspect, embodiments of the invention may provide analysis of the data provided, rendering the output or the report more meaningful to the audiences who may be managers or executives. Moreover, FIGS. 15-16 illustrate a report on each category that was previously presented/provided so as to provide a concrete example. In another example, FIG. 17 may present an end-cover as a function of the configuration files.

Referring to FIG. 2 again, after the generation of these configuration files, the system may run the generation steps (sample about JSON configuration and HTML or PDF template is showed in FIG. 2). In another embodiment, the system may include one or more components or modules to perform or execute the steps, such as get data at 206, get chart at 208, generate text at 210. In another embodiment, once the charts and texts are generated, the contents may be added to PDF at 212 before the PDF is finalized at 214 and distributed at 216.

In another embodiment, the system may include one or more processors to execute these steps. In another embodiment, the processors may be distributed and may be connected via computer networks and may connect data storages, database, or memories.

For example, a Report Generation Module may load the configuration file. Then, for each element from configuration file:

Query data repository to get data values for the element
If element is a chart it is derived to the Chart Generation Module
  Get the chart type (e.g. callout, tiny spline, column chart, line chart, labelled donut, . . . )
  Load the chart template
  Transform data as expecting the chart template
  Fill the chart template with the data values
  Generate the chart template
Else if element is for text it is derived to the Text Generation Module
  Get language or use default language
  Get formats or use default values (currency, decimal, dates, units formatting).
  Pre-process values (e.g. produce currency format, conversion to text of numbers).
  Use of rule engine to decide which kind of sentence will be generated from the Knowledge Base containing all possibilities.
  Retrieve from the Knowledge Base which elements should be used for the sentence generation (e.g. which kind of verb including the tense, subject of the sentence, which kind of grammar, time comparison elements, currency values, etc.)

Detection of gender and number of subject

Selection of vocabulary from a Domain Dictionary (e.g. verbs from the selected kind of verb, complements, pronouns, etc.)

Building phrases, pieces of sentences with Inflection of sentences items aligning gender and number with the subject.

Fill grammar template with all the phrases generating the text.

Extract location for the element (e.g. page and position)

Add generated element to the report at the desired location within the Layout Config (in this case the generation of a PDF)

Load Output Template

For each element from the report

Add element to the output format

Finalize the report generating the output format (e.g. generate a PDF)

The Distribution Workflow get the output file location

Get Distribution Configuration (e.g. for an email: subject, body, recipients, copied recipients, schedule)

Distribute the output report (e.g. send the pdf within an email)

Figure 3A:
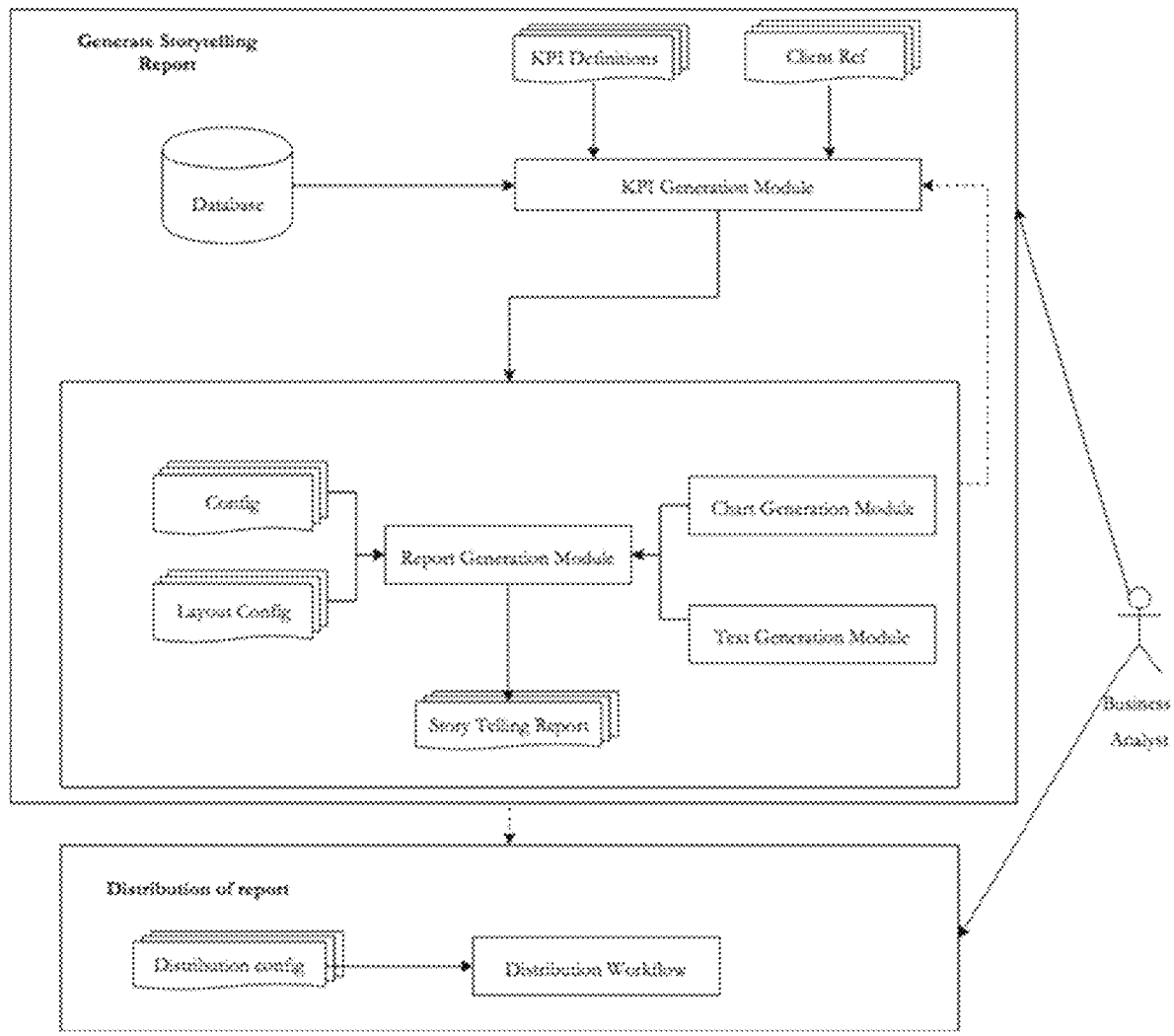
FIG. 3A and FIG. 3B are diagram illustrations a system for generating data-driven reports with descriptive and rich text and graphical contents according to one embodiment of the invention.

In another embodiment, FIG. 3 illustrates a computerized system with modular components that perform the illustrated steps below. In one example, the storytelling report system includes a database, a KPI generation module, a report generation module, and a distribution configuration and workflow. The KPI generation module may receive input stored in the database, and other input such as KPI definitions and client reference.

In one example, KPI Generation module load and prepare the data for next steps, making the following steps:

Check if new client sources are available

Load data from customer sources (e.g. load CSV files)

Store data on the repository (e.g. store data into a database)

Validate stored data

Clean and normalize data

Load global KPI definitions and client KPIs from configuration

Extract metrics using the configuration for KPIs

Generation of predicted data from history data for the KPIs

Store KPIs generated to be consumed by the Report Generation Module

The report generation module may receive input from configuration and layout configuration. The report generation module may also receive input from a chart generation module, and a text generation module.

In another embodiment, the Report Generation Module uses the information generated by the KPI Generation Module. This module uses the Config to gather the data generated previously, this contains information about which kind of visualization element will be used and which information will be the input for the visualization. Reading the configuration it will use the config and sends the information to the Chart Generation Module if the result is a chart or fixed text and, if it requires sentences in Natural Language, the information is sent to the Text Generation Module to produce the text. Finally the Report Generation Module adds each element generated by the Chart Generation Module or the Text Generation Module using the Layout Config.

The Distribution Workflow could be executed after the report is generated or it can be executed with a time range decision (e.g. each month).

Furthermore, The generation of the report is done by building small elements and putting together into the complete template report. For instance, charts are expressed using chart templates which are filled with the data values extracted from the data repository (e.g. values extracted from a database).

For instance, the generation of a callout is filling the values of a callout template like in the following example:

```
"callout_1": {
    "type": "Expense spend variance versus last year",
    "value": "18.1",
    "context": "2017",
    "positive": false
}
```

Figure 18:
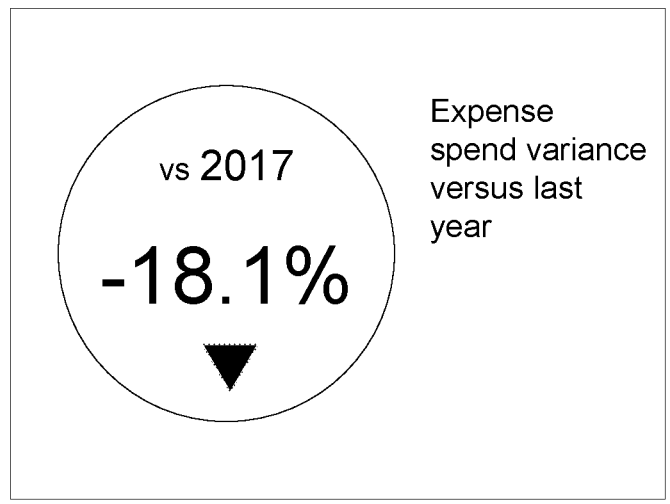
FIG. 18 is an illustration of a generated callout according to one embodiment of the invention.

This will produce the following final result for this item that will be inserted into the complete report as shown in FIG. 18:

In another example, for the generated text it is something similar, aspects of the invention may have the configuration for the text generation as the following example:

```
"text_1": {
    "label1": "number of trips",
    "previous.month.percentage1": 0.00000000012,
    "previous.year.percentage1": 0.03124681
}
```

This may generate a sentence that will be inserted into the final report as the example shown in FIG. 19:

In a further embodiment, the report generation module may also product an output to storytelling report, which may be led to distributions of reports. For example, the system may include the following steps:

"Read the configuration": that contains information about data required, text and chart generation, plus information required by the output format as the position of each visual item;

"Get Data": Retrieve required data from the common model that has all the processed data. If it is required, it may choose one of:

"Chart generation": once data is gathered, generate a chart, in the case of PDF the system generates an SVG image, so it may be transformed easily and may be embedded with a transformation into the PDF.

"Text generation": once data is gathered, use of a NLG component that may generate sentences about the data.

"Add to PDF": Add the item to the report with the generated chart or the generated text.

"Finalize PDF": Once the report is completed, in the case of PDF the system finalizes the PDF. In the case of HTML for web pages, no further transformation is necessary.

"Distribute PDF": Once the complete PDF is generated, it may be automatically distributed as the last step: in this case, it is send by mail.

Basically all the data from the customer conforms the parameters that manage all the process.

Other parameters that affects the end result are parameters that affect the output:

Language: the output language of a storytelling report

Numbers format and Currency: the output formats for numbers and currency affect all the process to provide required transformations of values (e.g. currency exchange) and to generate the adequate representation format that is different depending on the language, the currency and the decision on number of decimals required on the generation.

Output format: it changes the generated output so the system may provide a

PDF or other format depending on the consuming way and the user's device.

Main inputs are:

Raw data from customer that will be transformed to a common model.

Configuration about what kind of visual items will be generated: natural language text, charts or fixed text.

Brand template is a blank template with images adapted to the customer brand. In the case of PDF, it provides empty portions and/or pages that may be filled with the information (the generated text, images, numbers, etc.).

All the process implies multiple decisions:

Data transformation—The ELT implies lot of decisions:

Extracting data from source systems (CSV, Txt, ERP, SAP, Excel and other operational systems). Data from different source systems is converted into one consolidated data warehouse format which is ready for transformation, it requires decisions about how the data is gathered from the source system depending on the format.

Decide of which data repository is the desired, so system may load the data into a data repository.

Finally the system applies the transformation of the data, depending on the data and the configuration the system will select different kind of transformations:

applying business rules (e.g. calculating new measures and dimensions). It also depends on the data domain;

cleaning (e.g. mapping NULL values or codes to enumeration values as "F" to "Female");

filtering (e.g. selecting only certain columns to load);

splitting a column into multiple columns and vice versa;

joining together data from multiple sources (e.g. lookup, merge);

transposing rows and columns; and applying any kind of simple or complex data validation (e.g. if the first 3 columns in a row are empty then reject the row from processing).

Data representation—After ELT is applied, the system uses the report configuration to decide what is required for the next step in building the report:

query requests to extract insights from the common model;

selection of any kind of representation of the information, for instance visual representations:

populate a data request to draw a chart graph based on the data;

populate a data request to generate natural language sentences based on the data;

add generated charts, text or any other kind of data to the storytelling report.

Natural Language Generation:

depending on the data received the system decides which kind of sentence may be applied and built.

also it decides what is the grammar template that will be applied on the generation.

the system selects all required words and phrases from a dictionary to combine them using the grammar.

iterate over each word or phrase to make the inflection according to the labels (subjects) used. These labels describes what will be represented (e.g. travel spend) and are analyzed to extract the gender and the number, when the system is building a verb it selects the verb form (e.g. past perfect) and aligns the verb with the same gender and number (e.g. plural and third person).

In one embodiment, in Spanish, it also analyzes information about if the label is feminine or masculine as could affect to some elements into the generation as articles or adjectives.

Another particularity of Spanish is that verbs may be reflexive, this kind of verbs indicate that someone or somethings is performing an action on or for itself, and they requires a reflexive pronoun on inflection.

decides about what is the currency and number format that must be used on the generation of values. Also it may apply other measure symbols matching the language like (e.g., m2—square meters).

Report distribution—finally the system decides about what is the required format and distribution way, so it may send an email with a PDF or upload the final report to a document repository in HTML so customer may access to the report.

Quality Assurance (QA) process—at some steps there are some QA steps where the system decides if generated stuff is right generated or not to avoid the delivery of bad information to the customer:

Natural Language Generation: the system uses two main checks executed on the Continuous Integration step, before the generation of new releases:

Grammar checking through grammar rules which allows the early detection of some common errors (e.g. verb number not aligned with subject number).

Grammar checking based on frequency of word n-grams, this approach may discover some cases where probabilities of generated word n-grams are not right, so it may discover other kind of errors non-detected with the grammar rules approach.

The output of the process is a report in either HTML for reading online through the browser, web application, or mobile application, or via PDF for reading offline and also for easy re-distribution.

The output is distributed to the users automatically, each user receiving reports that are customized for his own department or organization and with text content appropriate to that specific report. The distribution is managed by the invention via configuration that may be set-up, modified, and managed by the administrator user.

Figure 3B:
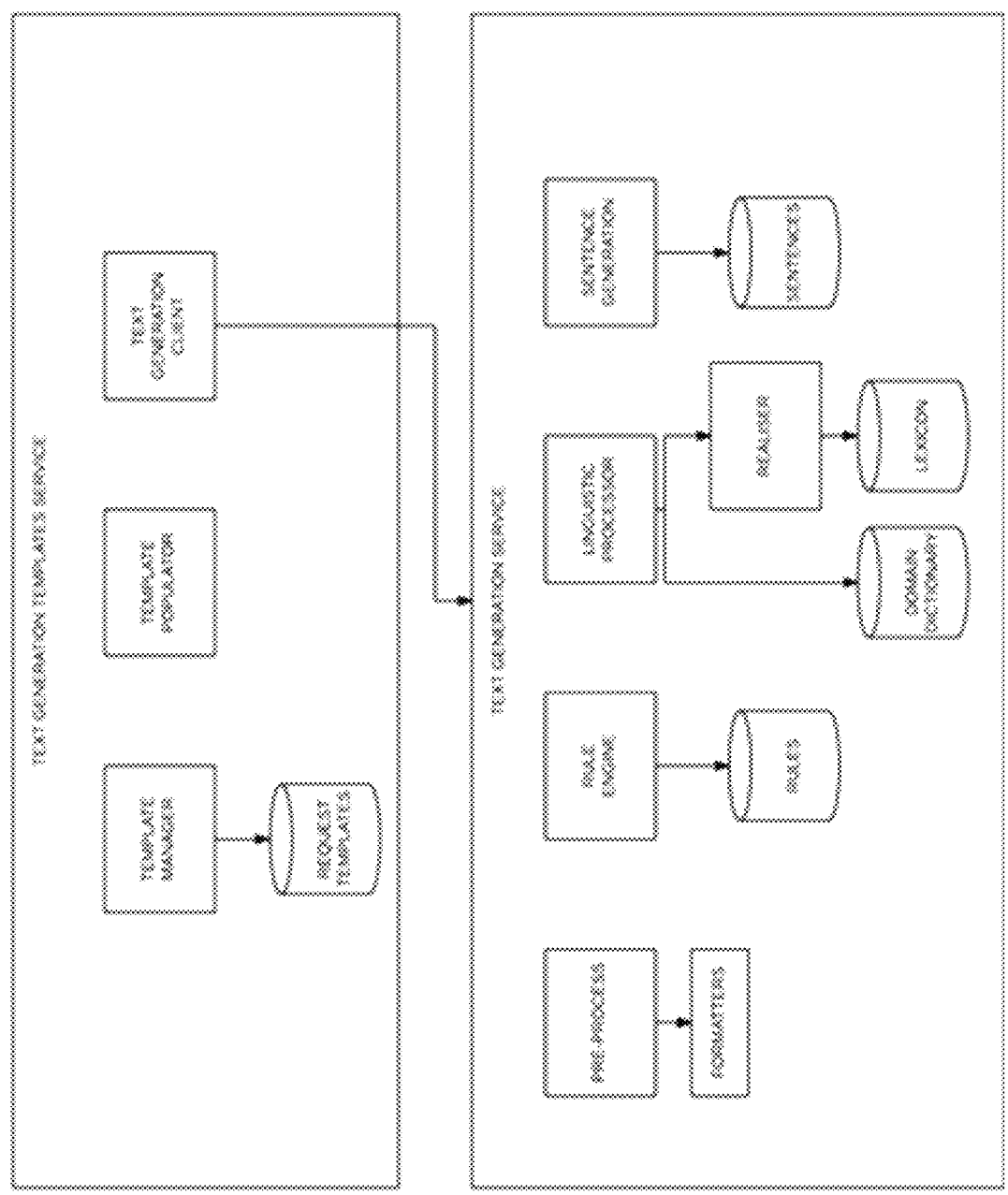
Figure 4:
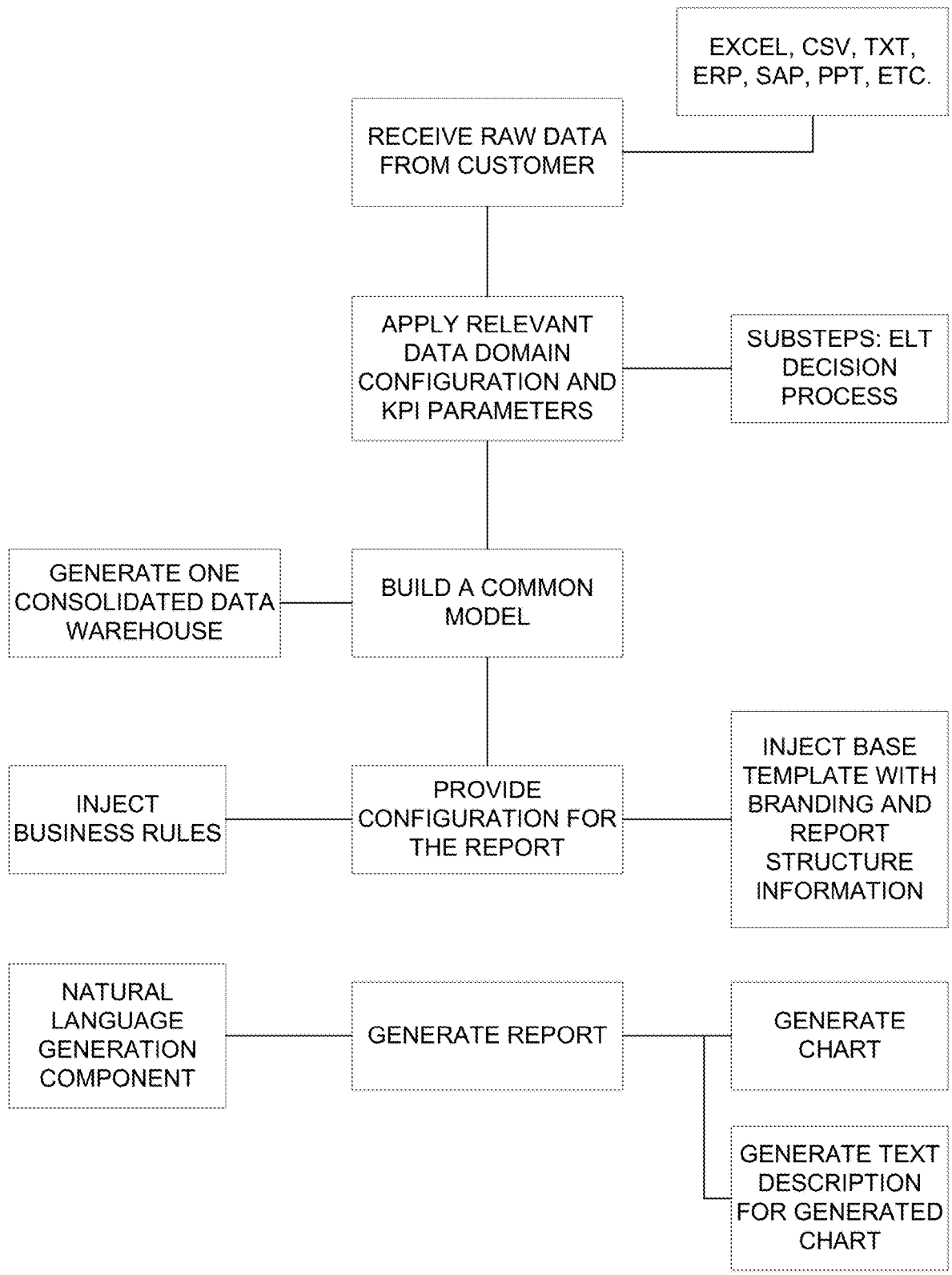
FIG. 4 is a flow chart for generating data-driven reports with descriptive and rich text and graphical contents according to one embodiment of the invention.
Figure 8:
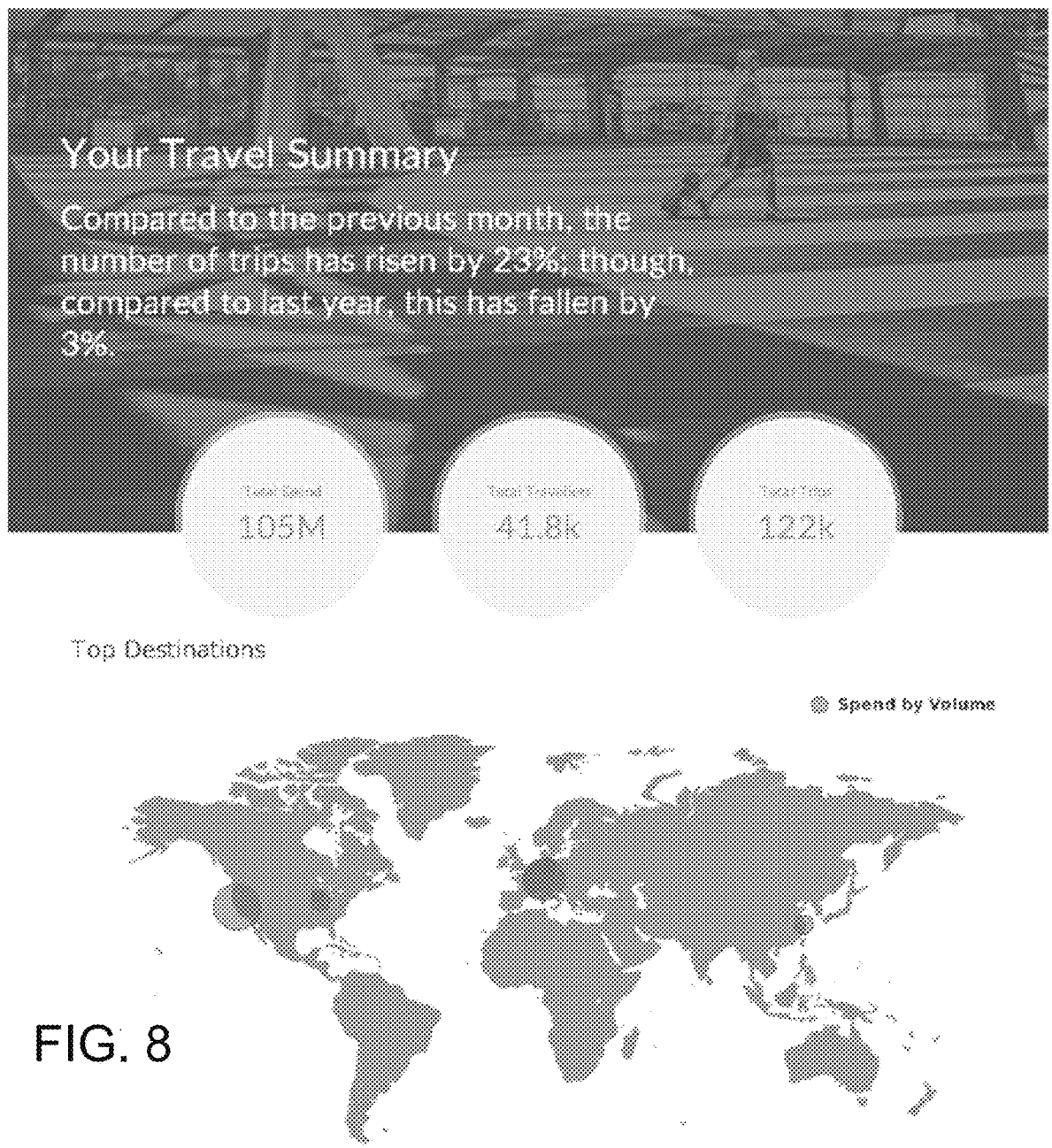
Figure 10:
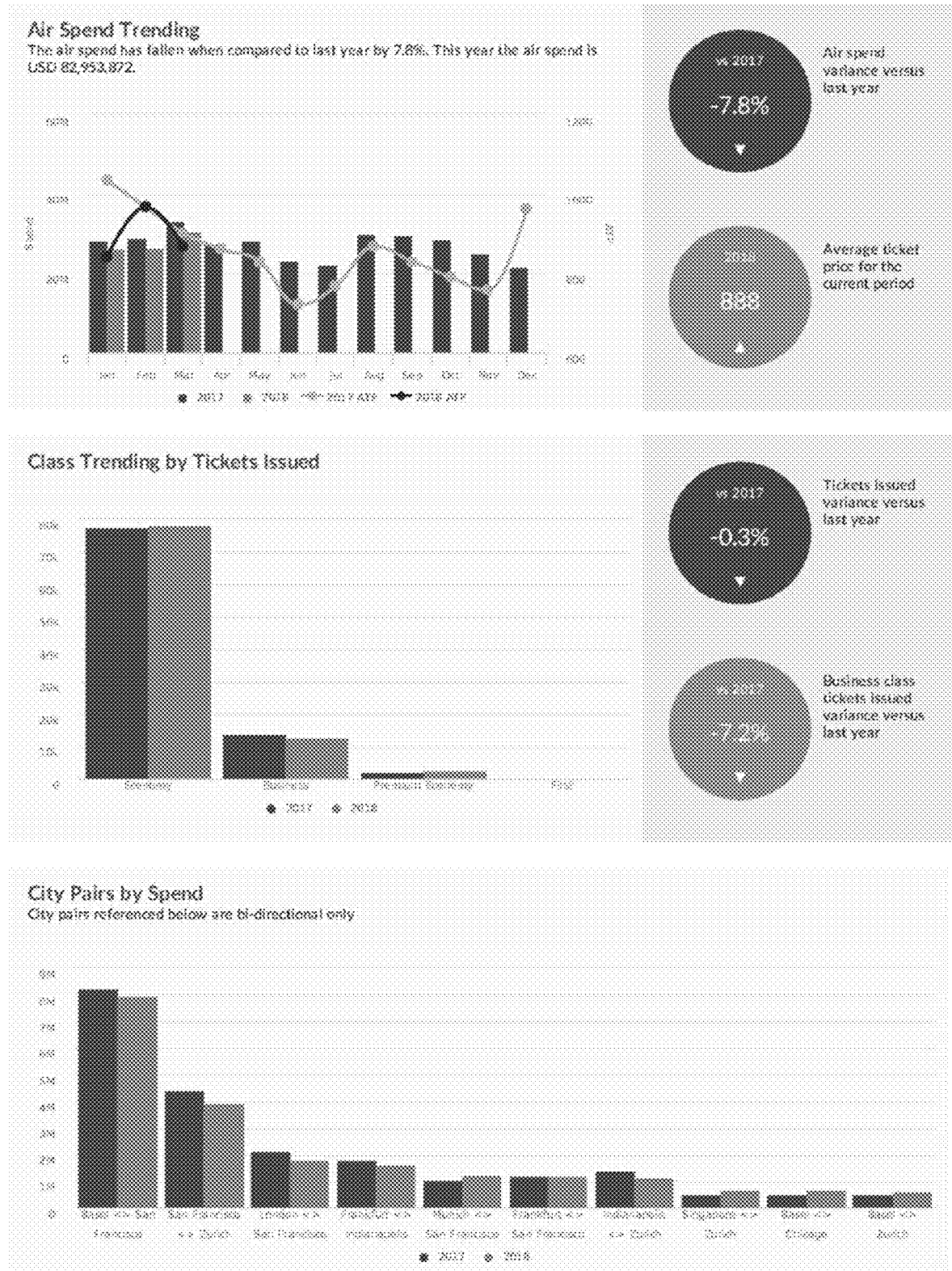
Figure 13:
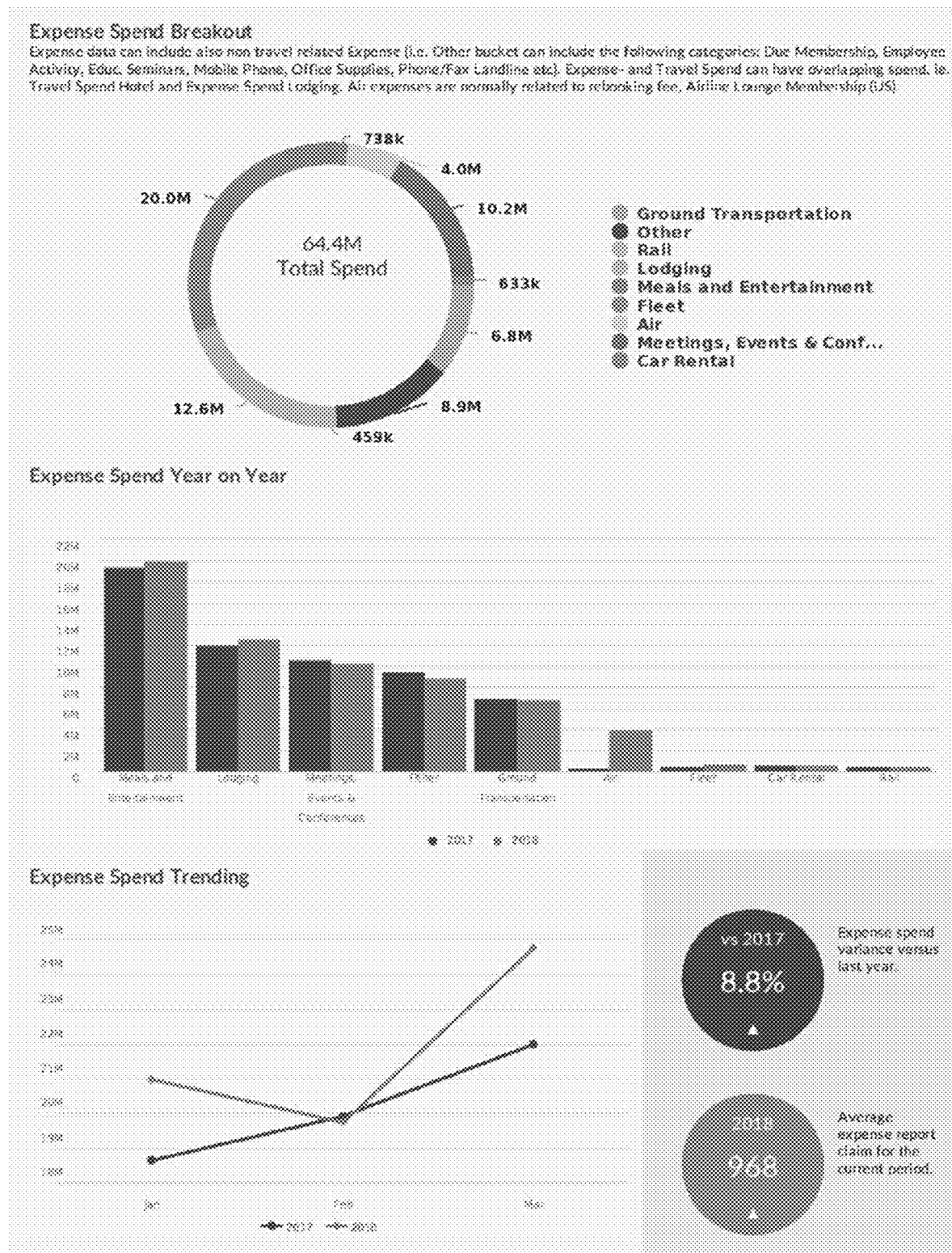
Figure 17:

In a further embodiment, FIG. 3B illustrates a further detail of the text generation module. For example, a text generation templates service: this is a service which works with simplified requests (a map containing keys and values) and use them to populate pre-fixed request templates that will be sent to the text service. The templates can have complex requests that are populated with parameters contained by the map, and it simplifies a lot the work on integration of the text generation service. You can find below a sample of the map containing keys and values that it's the input:

```
{
  "label1": "number of trips",
  "previous.month.percentage1": 0.00000000012,
  "previous.year.percentage1": 0.03124681
}
```

Internal workflow: it receives the request parameters and it tries to find the template from the Template Manager. After that, it uses the Template Populator to insert required values on the template and then it sends the filled template to the Text Generation Service through the Text Generation Client.

Text generation service: this service can generate sentences from a configuration object (a filled template from the Text Generation Service) which contains information about the output format and about the values which must be shown.

Internal workflow: it receives a request containing information about formats (decimal, dates, currency, . . . ) and the configuration to build sentences (language, labels, values, . . . ). It uses the Pre-Process component to format money, decimals, conversion to text of numbers, etc. Then the rule engine receives all the information of the request and select the most accurate kind of sentence that will be generated from the input data, also it generates the required information to build this kind of sentence (the kind of verb—including the tense and the number—, time comparisons, subject of sentence, etc.). After that, the Linguistic Processor will generate all phrases (all pieces to build the sentence), it will select some vocabulary from the possible that it is at the Domain Dictionary (verbs, complements, pronouns, etc.), and it uses the Realiser to inflect and to realise the phrases. Finally, all phrases are filled into a selected sentence, filling it with all of them to build a complete sentence.

Aspects of the invention re one that has wide-ranging applications to many use cases. Some of the applications are: Business KPI monitoring, Sales Effectiveness, Expense monitoring, Spend monitoring and forecasting, Risk monitoring.

Aspects of the invention may be limited to business use cases that are data-rich and where the text generated is describing quantitative values and conclusions. Reports that are free-form or based on human opinion are out of scope for the invention at this time.

Aspects of the invention will continue to become more intuitive, more attractive, and more interactive. The text generated will become more "human," subtle and nuanced. The invention will include automated video generation and Augmented Reality.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for other kinds of form generations from artificial intelligence tailored for different audiences. Further advantages and modifications of the above described system and method will readily occur to those skilled in the art. The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method for automatically producing data driven reports with descriptive texts and graphical contents comprising:
   receiving a request with data input to generate a report for an audience;
   identifying a configuration file for the report, said configuration file defining a number of infographics parameters of the report, said infographics parameters comprising: layout of the report, characteristics of the audience of the report, an amount of graphical elements of the report, tenses of the descriptive texts, a format of the descriptive texts in the report, and font settings of the report;
   receiving instructions from a user to customize the configuration file;
   in response to the received instructions, dynamically generating a map including keys and values in response to a request for generating descriptive texts;
   populating a pre-determined request templates with the generated mapped keys and values;
   selecting vocabularies from a domain dictionary stored in a data store;
   dynamically generating sentences based on the configuration file;
   dynamically determining factors of the graphical contents based on the configuration file, wherein the various factors comprise at least: an amount of the graphical contents as a function of the generated sentences, a location of the graphical contents, and a type of the graphical contents;
   generating a representation of the graphical contents as a function of the determined factors; and combining the sentences and the graphical contents as a function of the parameters of the configuration file to generate a report, wherein the report resembles a human-generated natural language narratives for the audience.

2. The computer-implemented method of claim 1, wherein the human-generated natural language narratives resembles a story.

3. The computer-implemented method of claim 1, wherein the graphical contents comprise a chart or a graph.

4. The computer-implemented method of claim 1, wherein generating the representation of the graphical contents comprises generating a chart as a function of the determined factors.

5. The computer-implemented method of claim 4, further comprising dynamically determining a chart type from a data visualization medium or component, wherein the data visualization medium or component comprising one or more of the following: callout, tiny spline, column chart, line chart, or labelled donut.

6. The computer-implemented method of claim 1, wherein the data input comprises numerical data in a spreadsheet.

7. A non-transitory computer readable medium having stored there computer-executable instructions generated via machine learning algorithms executing a computer-implemented method for automatically producing data driven reports with descriptive texts and graphical contents, said computer-executable instructions comprising:
    receiving a request with data input to generate a report for an audience;
    identifying a configuration file for the report, said configuration file defining a number of infographics parameters of the report, said infographics parameters comprising: layout of the report, characteristics of the audience of the report, amount of graphical elements of the report, tenses of the descriptive texts, a format of the descriptive texts in the report, and font settings of the report;
    receiving instructions from a user to customize the configuration file;
    in response to the received instructions, dynamically generating a map including keys and values in response to a request for generating descriptive texts;
    populating a pre-determined request templates with the generated mapped keys and values;
    selecting vocabularies from a domain dictionary stored in a data store;
    dynamically generating sentences based on the configuration file;
    dynamically determining factors of the graphical contents based on the configuration file, wherein the various factors comprise at least: an amount of the graphical contents as a function of the generated sentences, a location of the graphical contents, and a type of the graphical contents;
    generating a representation of the graphical contents as a function of the determined factors; and
    in response to the machine learning algorithms, combining the sentences and the graphical contents as a function of the parameters of the configuration file to generate a report resembling a human-generated natural language narratives for the audience, wherein the descriptive texts and the graphical contents are presented as a function of the audience.

8. The non-transitory computer readable medium of claim 7, wherein the graphical contents comprise a chart or a graph.

9. The non-transitory computer readable medium of claim 7, wherein generating the representation of the graphical contents comprises generating a chart as a function of the determined factors.

10. The non-transitory computer readable medium of claim 9, further comprising dynamically determining a chart type from a data visualization medium or component, wherein the data visualization medium or component comprising one or more of the following: callout, tiny spline, column chart, line chart, or labelled donut.

11. The non-transitory computer readable medium of claim 7, wherein the human-generated natural language narratives resembles a story.

12. The non-transitory computer readable medium of claim 7, wherein the data input comprises numerical data in a spreadsheet.

13. A computer-implemented system for automatically producing data driven reports with descriptive texts and graphical contents comprising:
    a processor configured to execute computer-executable instructions for:
        receiving a request with data input to generate a report for an audience;
        identifying a configuration file for the report, said configuration file defining a number of infographics parameters of the report, said infographics parameters comprising: layout of the report, characteristics of the audience of the report, graphical elements of the report, tenses of the descriptive texts, a format of the descriptive texts in the report, and font settings of the report, wherein the configuration file is customizable by the audience;
        in response to the received instructions, dynamically generating a map including keys and values in response to a request for generating descriptive texts;
        populating a pre-determined request templates with the generated mapped keys and values;
        selecting vocabularies from a domain dictionary stored in a data store;
        dynamically generating sentences based on the configuration file;
        dynamically determining factors of the graphical contents based on the configuration file, wherein the factors comprise at least: an amount of the graphical contents as a function of the generated sentences, a location of the graphical contents, and a type of the graphical contents;
        generating a representation of the graphical contents as a function of the determined factors; and
        combining the sentences and the graphical contents as a function of the parameters of the configuration file to generate a report, wherein the report resembles a human-generated natural language narratives for the audience.

14. The computer-implemented system of claim 13, wherein the human-generated natural language narratives resembles a story.

15. The computer-implemented system of claim 13, wherein the graphical contents comprise a chart or a graph.

16. The computer-implemented system of claim 13, wherein generating the representation of the graphical contents comprises generating a chart as a function of the determined factors.

17. The computer-implemented system of claim 16, further comprising dynamically determining a chart type from a data visualization medium or component, wherein the data visualization medium or component comprising one or more of the following: callout, tiny spline, column chart, line chart, or labelled donut.

18. The computer-implemented system of claim 13, wherein the data input comprises numerical data in a spreadsheet.

\* \* \* \* \*

UNITED STATES PATENT AND TRADEMARK OFFICE
CERTIFICATE OF CORRECTION

PATENT NO. : 10,956,655 B2
APPLICATION NO. : 16/421465
DATED : March 23, 2021
INVENTOR(S) : Choe Page 1 of 1

It is certified that error appears in the above-identified patent and that said Letters Patent is hereby corrected as shown below:

On the Title Page

Item (57), Abstract:
Please delete the following:
"Embodiments of the invention automate some of the human report generation process with the application of new AI and machine learning technologies plus the automatic generation of cutting-edge infographics, that is also not aesthetically pleasing but also engage the report reading audience. Aspects of the invention employ specific implementations of natural language generation and the recognition of elements of infographics that complimentary to the natural language generation."

And insert the following:
--Embodiments of the invention automate some of the human report generation process with the application of new AI and machine learning technologies plus the automatic generation of cutting-edge infographics, to produce aesthetically pleasing content that engage the report reading audience. Aspects of the invention employ specific implementations of natural language generation and the recognition of elements of infographics complimentary to the natural language generation.--

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*